Patented Feb. 18, 1941

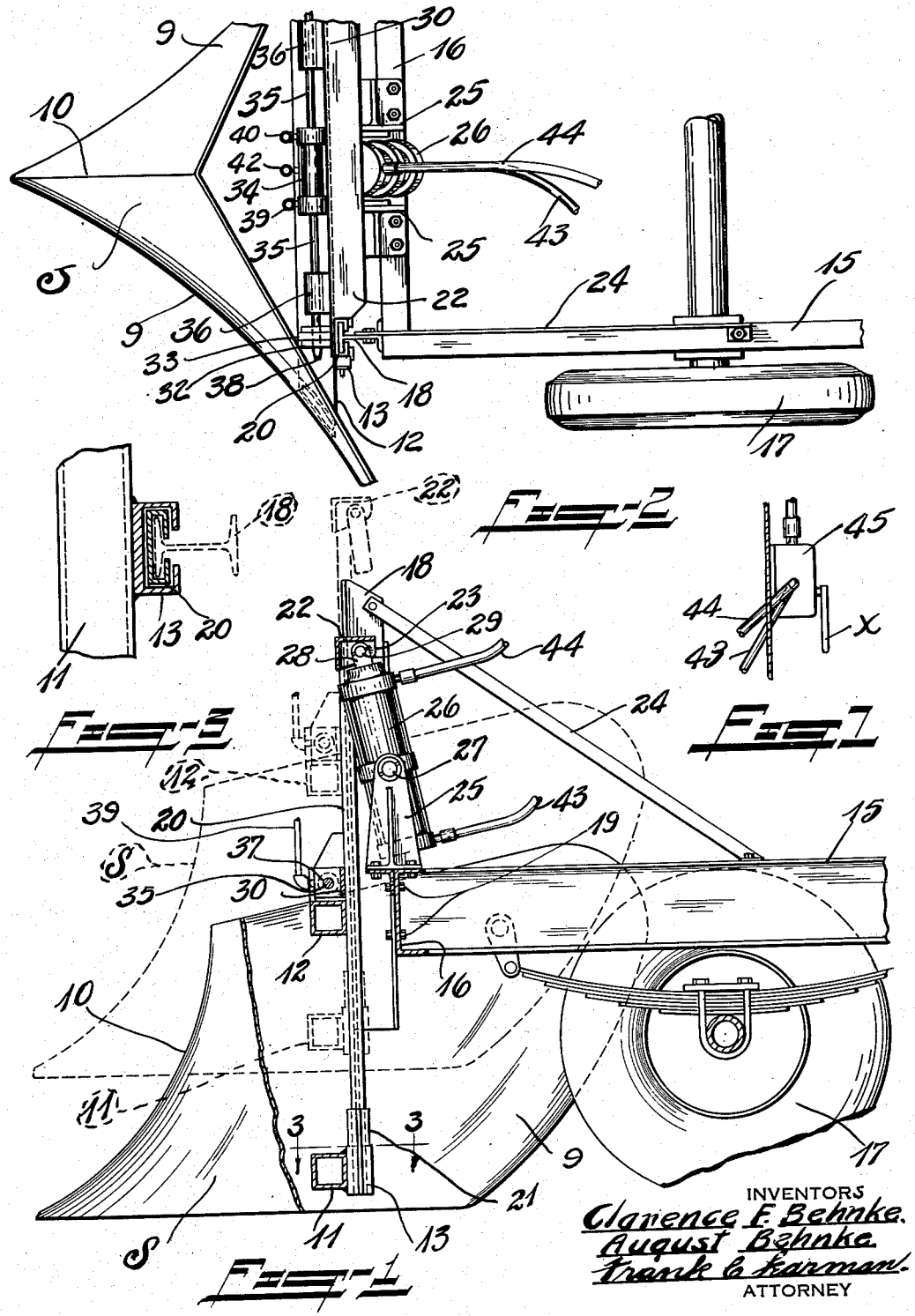

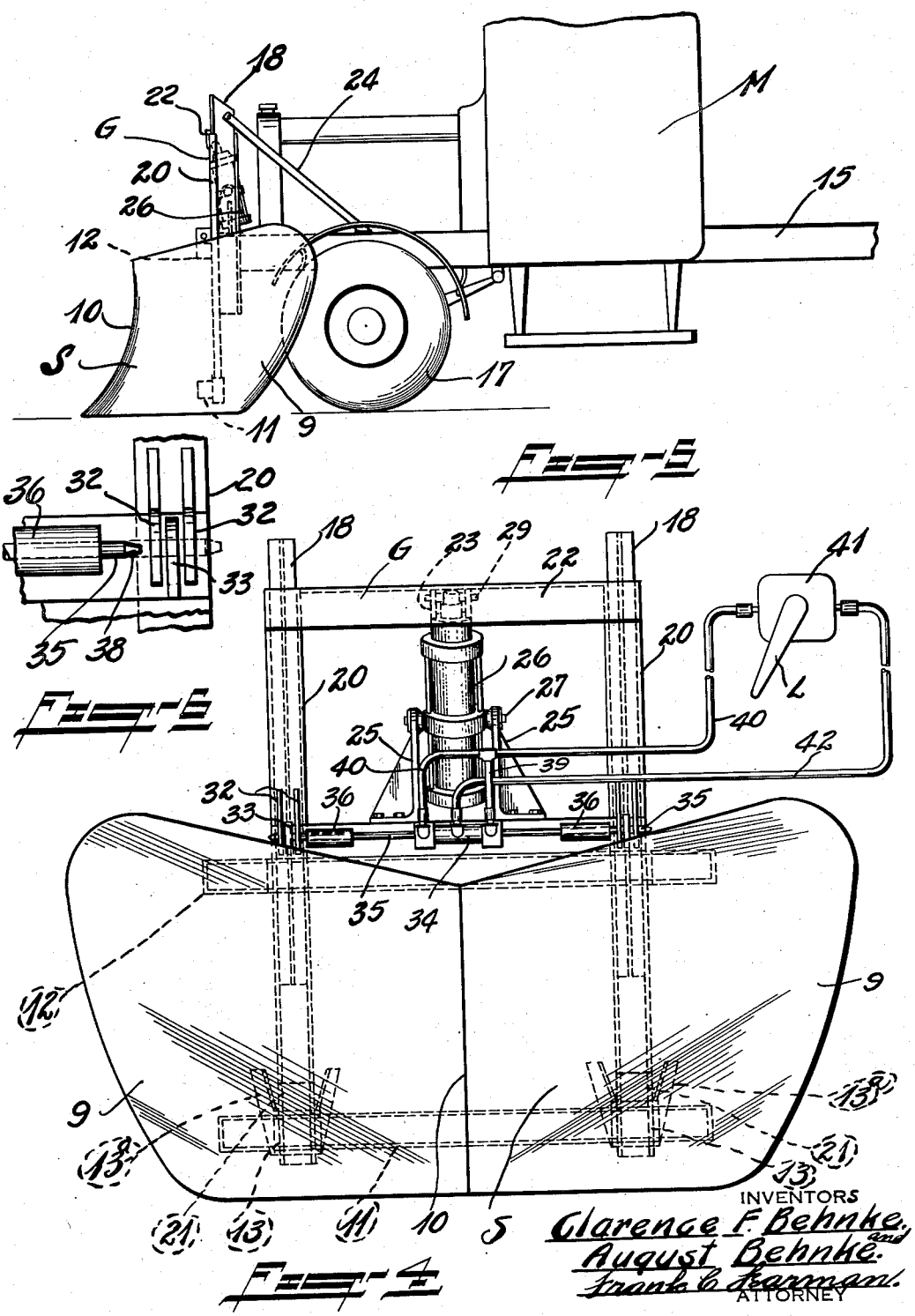

2,231,875

UNITED STATES PATENT OFFICE 2,231,875

SNOWPLOW

August Behnke and Clarence F. Behnke,
Gladwin, Mich.

Application March 11, 1940, Serial No. 323,460

8 Claims. (Cl. 37—44)

This invention relates to snowplows adapted for use in connection with motor trucks, tractors and similar vehicles.

One of the prime objects is to design a snowplow for mounting on the front end of the vehicle and provide simple, practical, and economical hydraulic means for raising and/or lowering said plow and for holding it in adjusted position.

Another object is to provide quickly detachable means for attaching or releasing the snowplow from the vehicle, without the necessity of the vehicle operator leaving the vehicle, and without manual labor.

A further object is to provide guiding or centering means for aligning the plow with the attaching means to facilitate the attachment of the plow to the vehicle.

A still further object is to provide means for holding the snowplow down in lowered position when the snow is heavy and frozen and tends to lift the plow.

With these and other objects in view, our invention consists in the construction, arrangement, and combination of the various parts of the device, whereby the objects are attained as hereinafter more fully set forth, pointed out in our claims, and illustrated in the accompanying drawings in which Fig. 1 is a fragmentary, side, elevational view of a motor vehicle showing our improved snowplow attached thereto, parts being broken away to illustrate the construction, the broken lines showing the plow and associated parts in raised position.

Fig. 2 is a top plan view of the mechanism shown in Fig. 1.

Fig. 3 is an enlarged, fragmentary, sectional, plan view taken on the line 3—3 of Fig. 1, the broken lines showing one of the I-beam tracks.

Fig. 4 is a front, elevational view, showing the plow, tracks, and operating parts.

Fig. 5 is a fragmentary, side, elevational view, showing a motor truck with my improved snowplow mounted thereon.

Fig. 6 is an enlarged, fragmentary, front, elevational view showing the brackets and locking rods, the solid lines showing the rod in unlocked position, the broken lines illustrating the locked position.

Fig. 7 is a detail showing the control valve on the motor truck.

Referring now to the accompanying drawings in which we have shown one preferred embodiment of our invention, the snowplow is illustrated at S; this plow is of the U-shape type and comprises wings 9 having a point 10 as usual, and the free flaring ends of the wings are secured in spaced relation by means of the vertically spaced, transversely disposed brace members 11 and 12 respectively.

Guide sockets 13 are welded or otherwise secured to the lower brace member 11 and include a flared side members 13a as shown and for a purpose to be presently described.

The motor truck M can be of conventional design and includes the longitudinally disposed frame members 15 connected by the transversely disposed cross members 16, said frame being carried on the ground engaging wheels 17 in the usual manner.

Spaced apart, vertically disposed track members 18 are secured to the member 16 of the vehicle frame by means of bolts 19, and channel-shaped guide members 20 engage with and are vertically slidable on said tracks, the lower end of each guide extending into the socket 13 as shown, and a stop member 21 is fixed on each guide in predetermined position to limit the extension into said socket.

A transversely disposed member 22 connects the upper ends of the guides 20 to form a guide frame G and clips 23 are welded or otherwise secured thereto, angularly disposed brace members 24 being secured to the track members 18 and truck frame respectively, and serve to reinforce and secure the upper end of the guide frame in proper position.

Spaced apart brackets 25 are mounted on the vehicle frame as shown, and a hydraulic cylinder 26 is revolvably mounted thereon by means of studs 27, the upper end of the piston rod 28 being pivotally connected to the clips 23 by means of the pin 29.

A transversely disposed bar 30 connects the guide members 20 at a point intermediate their length, and spaced apart brackets 32 are provided on each of the guides 20, a similar bracket 33 being formed integral with the member 12 and adapted to be received between the brackets 32 when the parts are in assembled relation on the motor truck.

A hydraulic cylinder 34 is mounted on the bar 30, and opposed piston rods 35 project from the ends thereof, each rod being slidably mounted in a sleeve 36 provided on the bar 30, and thence projecting through suitable openings 37 provided in the brackets 32 and 33, said openings being in horizontal alignment when the parts are in assembled relation, the ends of said rods being tapered as at 38 to facilitate the operation.

Hydraulic supply lines 39 and 40 respectively, connect to the respective ends of the hydraulic cylinder 34 and lead to a control valve 41 which is in turn connected to a suitable source of hydraulic pressure (not shown), a similar supply line 42 being connected to the center of the cylinder 34, and thence leading to the control valve 41, so that upon manipulation of the valve lever L by the truck driver, the valve can be controlled as desired.

Hydraulic supply lines 43 and 44 respectively, are connected to the respective ends of the hydraulic cylinder 26, said lines also leading to the control valve 45 which is controlled by a lever X so that the raising and lowering of the plow can be controlled as desired.

We do not deem it necessary to show or explain the hydraulic cylinders 26 and 34, or the control valve 41 in detail, as they can be of the conventional type at present on the market, it being understood that the cylinder 34 is equipped with two pistons (not shown) which are forced outwardly from each other by the admission of a pressure agent through the supply line 42, and these pistons can also be forced towards each other by admission of hydraulic pressure through the supply lines 39 and 40, likewise the admission of hydraulic pressure to the cylinder 26 through the supply line 43 serves to raise the piston and with it the guide frame G, and then by the admission of a pressure agent to the upper end of the cylinder 26 through the supply line 44, the piston will be forced downwardly to lower the guide frame accordingly.

The flared guides 13a provided on the opposite sides of each socket member 13 serve to guide and center the lower ends of the guides 20 with relation to the plow so that the mounting or attaching of the plow to the truck is greatly facilitated.

In practice and when desiring to attach the snowplow, the truck driver drives between the open wings of the snowplow and until the guides 20 engage the brace member 12; he then manipulates the control valve 45 to supply the pressure agent to the cylinder 26 through the supply line 44 forcing the guides 20 downwardly so that the ends enter the sockets 13. Pressure is next introduced to the cylinder 34 through the pressure line 42 to force the rods 35 outwardly and through the openings 37 provided in the brackets 32 and 33 respectively, thus securely locking the snowplow in position, then by application of the pressure agent to the cylinder 26 through the supply line 43 or 44, the plow can be raised or lowered accordingly.

We wish to direct particular attention to the fact that the plow can be raised sufficiently to afford the same road clearance as the axles of the truck, and to remove the plow it is only necessary to apply the pressure agent through the supply lines 39 and 40 to force the rods 35 endwise towards each other, and then by raising the guide frame so that the guides slide free from the sockets 13 and the truck can be backed free from the plow and is available for any normal use.

The attaching and detaching is quick, simple, and easy; there is no mutual labor necessary, it being only necessary to drive the truck into proper contact with the plow; the parts are all rigid and substantial they can be economically manufactured and assembled; and the pressure is available on all motor trucks and tractors.

From the foregoing description, it will be clearly obvious that we have perfected a practical, substantial, and economical snowplow and attaching means for attaching it to a power driven vehicle.

What we claim is:

1. In a snowplow structure, the combination of a power vehicle, a V-shaped plow, a vertical track on the front end of the power vehicle, a guide frame vertically adjustable on said track and pressure actuated means mounted on said guide frame for securing said plow to said guide frame.

2. In a snowplow structure, the combination with a power vehicle, a snowplow, a vertical track on said power vehicle, a guide frame vertically adjustable on said track, hydraulically actuated means for securing said plow to said frame, and means for vertically adjusting said frame and plow on said track.

3. In a snowplow structure, the combination with a self-propelled motor vehicle, a snowplow, a vertically disposed track on said vehicle, a guide frame adjustable on said track, sockets on said plow and adapted to accommodate the ends of the guide frame, hydraulically actuated means for locking said plow to said guide frame, and separate hydraulically actuated means mounted on said vehicle for vertically adjusting said guide frame and plow on said tracks.

4. In a snowplow structure, the combination with a self-propelled motor vehicle, a snowplow, a vertical track on the vehicle, a guide frame slidably mounted on said track, brackets on said guide frame and snowplow respectively, hydraulically actuated piston rods mounted on said guide frame and adapted to engage said brackets to lock the snowplow to the guide frame, a hydraulic cylinder including a piston stem rockably mounted on the vehicle, with the stem connected to the guide frame, and means for admitting a pressure agent to said cylinder for controlling the vertical movement of the guide frame.

5. In a snowplow structure, the combination with a self-propelled vehicle, of a snowplow, a vertical track on the vehicle, a guide frame slidable on said track, sockets on said plow and adapted to slidably receive the ends of the guide frame, opposed, hydraulically actuated means mounted on said guide frame, and engageable with said track for securing said frame in set position and hydraulically actuated means mounted on said vehicle and connected to said guide frame for controlling the vertical travel thereof.

6. In a snowplow structure, the combination of an automobile truck, a V-plow, vertical tracks mounted on the front of the truck, a guide frame mounted for vertical travel thereon, a hydraulic cylinder mounted on said truck, a piston therein and an upwardly extending piston rod hingedly connected to said guide frame whereby the frame is actuated by the introduction of a pressure agent to said cylinder, aligned brackets on the guide frame and snowplow respectively, a hydraulic cylinder on said guide frame, pistons in said cylinder, and opposed horizontally, movable piston rods connected to the pistons and engageable with said brackets for locking said snowplow on said guide frame when actuated by the introduction of a pressure agent to said cylinder.

7. In a snowplow structure the combination of a self-propelled vehicle, a snowplow, tracks on said vehicle, a guide frame on said tracks, a hydraulic cylinder pivotally mounted on the vehicle and provided with a piston having a piston rod pivotally connected to said frame, sockets on said plow and adapted to receive the lower ends of the guide frame, lugs on the snowplow and guide frame respectively, openings in said lugs and adapted to rest in horizontal alignment when the parts are in assembled relation, a second hydraulic cylinder, opposed pistons therein, and rods connected thereto and engaging in the lug openings when the parts are in assembled relation, and means for admitting a pressure agent to each of said cylinders for locking the snowplow on the frame and controlling the vertical movement of said frame and plow.

8. In a snowplow structure, the combination with a power vehicle, of a snowplow, a vertical track on the vehicle, a guide frame slidable on said track; sockets on the plow and provided with flaring guides adapted to guide and accommodate the ends of the guide frame, stops for limiting the downward travel of the guide frame with relation to the sockets, hydraulically actuated means mounted on the guide frame for locking the plow on the frame, and hydraulically actuated means pivotally mounted on said vehicle and connected to said guide frame for controlling the vertical movement thereof.

CLARENCE F. BEHNKE.
AUGUST BEHNKE.